United States Patent Office 3,432,557
Patented Mar. 11, 1969

3,432,557
ALDOLING PROCESS
Ronald H. Wile, Bay City, Tex., assignor to Celanese Corporation, New York, N.Y., a corporation of Delaware
No Drawing. Filed Mar. 23, 1966, Ser. No. 536,295
U.S. Cl. 260—603
Int. Cl. C07c 45/00
7 Claims

ABSTRACT OF THE DISCLOSURE

In processes in which an alkaline aldoling catalyst is employed to convert a carbonyl compound to the corresponding aldol, followed by dehydrating the aldol with an acid catalyst, catalyst remaining in the product withdrawn from the aldoling reaction step is an undesired contaminant which affects the dehydration reaction adversely. These adverse effects are eliminated by subjecting the crude aldol reactor effluent, containing the alkaline catalyst and in the presence of water, to a decantation operation, under controlled temperature conditions, whereby the alkaline catalyst is removed in an aqueous phase containing only a minimal quantity of the aldol.

---

This invention relates to the processing of carbonyl compounds by the aldol reaction.

More particularly it relates to processes in which a carbonyl compound is converted to its aldol derivative, which aldol derivative is then chemically dehydrated to the corresponding unsaturated carbonyl compound. Specifically it relates to a method for effecting a substantial saving in the amount of acidic dehydration catalyst required for the dehydration of an aldol to the corresponding unsaturated carbonyl compound.

The invention is particularly applicable to processes in which n-butyraldehyde is aldoled to butyraldol with an alkaline catalyst, after which the butyraldol is dehydrated to 2-ethyl hexenal in the presence of an acidic compound such as phosphoric acid.

The aldol condensation is widely employed in organic chemical technology to effect the condensation of two carbonyl-containing molecules to form a larger molecule. The two carbonyl-containing molecules being condensed may be identical or they may be different. For example two molecules of butyraldehyde may condense to form an eight carbon atom product, or one molecule of butyraldehyde may be condensed with one molecule of acetaldehyde to form a six carbon atom product. Both aldehydes and ketones will undergo aldol condensations, the product in the former case being an aldol and in the latter case a ketol. In the following description of this invention, the term "aldol" with be employed to designate both aldols and ketols, since the invention is applicable in the processing of both.

The aldol condensation is catalyzed by both acids and bases, but bases are generally more effective and are generally employed. Thus the feed to the aldol reaction system comprises the carbonyl compound or compounds being aldoled, a catalyst (normally an alkaline material such as sodium hydroxide) and, in certain instances, water. Two and three carbon atom carbonyl compounds, e.g. acetaldehyde and propionaldehyde, are normally aldoled in a substantially dry condition. That is, the only water present is a small amount which may have been introduced with the aldoling catalyst, which is typically sodium hydroxide in aqueous solution. Higher molecular weight carbonyl compounds, e.g. butyraldehyde, are normally aldoled in the presence of a substantial quantity of water over and above that introduced with the catalyst. The reason for the presence of the water in this case is the limited solubility of the alkali in the mixture of aldol and carbonyl compound resulting from the reaction. By maintaining in the aldoling reactor a substantial proportion of water, and by keeping this water thoroughly mixed with the organics that are present, an adequate distribution of the alkaline catalyst is maintained throughout the system. The crude product of the aldol system is, therefore, typically a mixture comprising the aldol itself, some of the unreacted carbonyl material from which the aldol has been formed, the alkaline aldol catalyst, and a quantity of water which may vary over a wide range.

One common use of aldols is as intermediates for the production of their unsaturated carbonyl derivatives, which are then themselves intermediates for the production, as by hydrogenation, of end products such as alcohols. The conversion of the aldol to the corresponding unsaturated carbonyl compound is accomplished by dehydration, which is normally carried out in the presence of an acidic catalyst which is in an aqueous phase which is kept dispersed throughout the dehydration reactor. For example, acetaldol is dehydrated to crotonaldehyde, which can be converted to butyraldehyde or butanol; butyraldol can be dehydrated to 2-ethyl hexenal, which in turn can be hydrogenated to 2-ethyl hexanol. Many other variations exist, based on various aldols and various acidic dehydration catalysts, but common to most of them is the fact that a crude aldol product initially containing an alkaline aldol catalyst is converted to an unsaturated carbonyl compound by dehydration in the presence of an acidic catalyst. Concomitantly, all these processes likewise have in common one unsatisfactory aspect. This is that the alkaline aldoling catalyst contained in the crude aldol product will, upon introduction of the aldol product into the dehydration reaction system, create difficulty in three ways. First, it consumes a certain portion of the acidic dehydration catalyst employed in the dehydration system by neutralizing it to form salts. This results in a depletion of the acidic dehydration catalyst, requiring replacement to maintain the necessary degree of acidity. This is a substantial expense, particularly if the acidic catalyst is a comparatively expensive acid such as phosphoric. Second, the salts produced in the reaction of the alkaline catalyst with the acidic catalyst by causing resins to precipitate, tend to foul portions of the dehydration process equipment, particularly the heat exchangers employed in maintaining the temperature of the dehydration reactor and in vaporizing out of the reactor the unsaturated aldehyde product, which is commonly removed from the reactor as a vapor along with water vapor. Third, and most important in most cases, the presence of the aforementioned salts inhibits, by the emulsion-breaking effect typical of dissolved salts, the intimate contacting of the dehydration catalyst, which is in an aqueous phase, with the aldol being hydrated, which is normally in a non-aqueous phase in the dehydration reactor. For proper action of the dehydration reactor, i.e. for rapid and efficient conversion of the aldol to the unsaturated aldehyde, it is necessary that the aqueous phase containing the acidic catalyst and the non-aqueous phase containing the aldol be maintained in a state of intimate contact. That is, the system should comprise essentially an emulsion or macro-emulsion. The usual expedient which is employed in the existing art is to maintain a continuous draw-off of liquid from the dehydration reactor to prevent the build-up of salts in the liquid contents thereof. This draw-off results in a further loss of the acidic catalyst. In a typical large scale plant employing phosphoric acid as dehydration catalyst it is not unusual for the combined loss of phosphoric acid, due to the aforementioned draw-off and the neutralization with alkaline aldol catalyst, to exceed one hundred dollars per day.

In view of the above it is therefore evident that the art has long needed an inexpensive and effective method for removing the alkaline aldoling catalyst from the crude aldol product before the aldol product is brought into contact with the acidic dehydration catalyst in the dehydration step of processes in which aldols are converted to the corresponding unsaturated carbonyl compounds.

It is an object of this invention to provide a method for removing the alkaline aldoling catalyst from the crude aldol product before it is fed to the dehydration step.

It is another object of this invention to accomplish this removal of the alkaline catalyst without suffering any substantial loss of valuable organic chemicals.

Other objects of the invention will be apparent from the following description and claims.

In accordance with the present invention a crude aldol product comprising an aldol and an alkaline aldoling catalyst is, after withdrawal from the aldoling reaction system but before introduction into the dehydration reaction system, caused to separate into two liquid phases, one being an aqueous phase and the other being an oil phase. In aldoling systems in which an appreciable quantity of water has been maintained in the aldol reactor, the crude aldol product will normally contain sufficient water to form an aqueous phase if the crude aldol product is simply passed through conventional phase-separating equipment, such as decanters or centrifugal separators, while being held at a temperature below that above which, in some instances, the two phases become miscible. In a few instances the aldol reaction may be conducted in the presence of very little water so that it is helpful to mix with the crude aldol product a quantity of water, conveniently about 0.1 to 1.0 volume of water per volume of aldol product, in order to assure the formation of the aqueous phase with the employment of which this invention is concerned. It has been discovered that, when the aldol product is caused to separate into these two phases, substantially all of the alkaline aldoling catalyst accumulates in the aqueous phase. By drawing off this aqueous phase in accordance with the practice of this invention, the alkaline material is thus effectively removed from the crude aldol product. The oil phase, comprising the aldol, is then employed as feedstock for a dehydration reaction system in which the aldol, in the presence of an acidic catalyst, is dehydrated to an unsaturated carbonyl compound. The formation and accumulation of salts in the dehydration reaction system are thus avoided, together with the adverse results of the presence of such salts previously described. The result is improved operability of the dehydration system and a substantial diminution in the consumption of dehydration catalyst.

The invention is effective in the processing of substantially all aldol reaction products comprising an aldol and a water soluble alkaline catalyst provided the solubility characteristics of the crude aldol product are such that, at some particular temperature are described below, a substantially complete partitioning of the organic components into an oil phase which is in contact with an aqueous phase containing the alkaline catalyst can be obtained. In this regard, it has been discovered that such partitioning will occur if the aldol has at least six carbon atoms in its molecule and if each carbonyl compound employed in preparing the aldol (some of the original carbonyl material, not converted to the aldol, will typically be present in the aldol product) has at least three carbon atoms in its molecule. For example, the invention is completely effective in processing a crude aldol product comprising butyraldehyde, butyraldol, water, and sodium hydroxide. It is less effective in systems containing acetaldol and acetaldehyde, because of loss of organics into the aqueous phase and difficulty in even forming two phases. Systems comprising six carbon-atom aldols and three carbon-atom carbonyl compounds are borderline but can be processed by the invention. Systems comprising aldols having more than eight carbon atoms become progressively easier to handle as the molecular weights of the components increase. The invention is particularly well adapted to processing aldols having from eight to twenty carbon atoms, in alkyl, aryl, and alkaryl configurations.

The effectiveness of the invention is believed to be due primarily to the fact that the alkaline aldoling catalyst introduces into the system sufficient polarity to reduce to a very low level any tendency of the organic component to partition into a water phase. For example, butyraldehyde has substantial solubility in water even at normal ambient temperatures, whereas in the presence of a butyraldol-containing organic phase and an alkaline aqueous phase it has been found, as will be shown in the examples included herewith, to have negligible solubility in the aqueous phase.

The invention is broadly applicable to the separation of water-soluble alkaline materials from substantially any aldol product comprising an aldol having at least six carbon atoms. The temperature at which the organic components of the crude aldol product will form an oil phase in the presence of an aqueous phase containing the aldoling catalyst will vary from case to case, but can easily be determined by simply cooling a sample in any suitable vessel, adding water as necessary to make the amount of water present about 25 volume percent of the organics present, and observing the highest temperature at which separation into two phases occurs. Subcooling below this temperature will tend to increase the separation efficiency, of course. In the case of an aldol mixture comprising butyraldehyde, butyraldol, water, and sodium hydroxide, this separation will occur at approximately 150° F., although lower temperatures (e.g. about 110° F.) will give improved results. Pressure is of no importance, provided it is high enough to retain substantially all of the crude aldol product in the liquid phase.

The chemical nature of the aldol product processed according to the present invention is likewise of no importance, provided the aldol product be one which has been formed by aldoling in the presence of a water soluble alkaline catalyst. This is for the reason that the simple phase separation process of the present invention cannot subject the crude aldol product to any conditions harsher than those it has experienced in the aldol reactor itself, the temperature employed being no higher than that employed in the aldol reaction and no new reactive chemical species being introduced. Therefore, any molecular species which has been through the aldol reactor will not be adversely affected by being subjected to the process of the invention. Should any solubilizing molecular substituents be attached to the aldol product, the simple cooling test previously described will suffice to determine whether or not the solubilizing effect is too great for satisfactory application of the invention to such product. If there be some degree of solubility of the aldol, or of one of the compounds from which it has been formed, in the aqueous phase, the invention can still be applied if additional processing, such as distillation, is applied to recover the dissolved organic material from the aqueous phase after it has been withdrawn from contact with the aldol product. Such auxiliary processing will be found helpful in attaining maximum product recovery in the case of some six carbon atom aldols, the carbonyl precursors of which (e.g. propionaldehyde) will be found soluble to some extent in the aqueous phase.

In the crude aldol product the ratio of unconverted feed carbonyl compound: aldol product:water:catalyst can be varied widely without affecting the applicability of the invention to the processing thereof. The ratio of these individual components one to another will depend in a given case upon a large number of factors, including nature and concentration of the catalyst, aldoling reaction temperature, degree of conversion maintained per pass in the aldoling reactor, and so forth. The invention is broadly applicable, however, to any crude aldol product composition likely to be encountered in actual commercial practice. In some instances a very large excess of water or, conversely, a very large excess of the organic components could conceivably result in a condition in which two liquid phases will not form upon cooling to a technologically feasible temperature. The simple test previously described will, however, show whether such a condition exists. In the case of a butyraldol product containing butyraldol, butyraldehyde, water and catalyst, normal commercial practice will result in a crude aldol product containing 30 to 90 weight percent butyraldehyde, 10 to 70 weight percent butyraldol, 0.5 to 80 weight percent water, and 0.001 to about 0.05 weight percent alkaline catalyst calculated as sodium hydroxide. The method of this invention operates satisfactorily throughout this range of compositions.

The following examples are given to illustrate the invention further. All parts are by weight unless otherwise specified.

Example I

Per hour, a crude aldol product containing 7,050 parts of butyraldehyde, 7,050 parts of butyraldol, 1,660 parts of water, and 3.2 parts of sodium hydroxide (the aldol catalyst) were fed directly, without intermediate processing, into a dehydration reaction system wherein, at a temperature of approximately 245° F. and under a pressure of approximately 25 pounds per square inch absolute, the butyraldol was dehydrated to produce approximately 5,850 parts per hour of 2-ethyl hexenal. In the dehydration reactor a minimum concentration of 40% phosphoric acid was maintained to catalyze the dehydration reaction. In order to maintain this minimum concentration of phosphoric acid, it was necessary to feed 146 parts per hour of makeup phosphoric acid to the dehydration reactor. In order to avoid a buildup of salts in the dehydration system, it was necessary to draw off from the dehydration reactor approximately 365 parts per hour of a liquid comprising largely water and phosphoric acid as well as 2-ethyl hexenal (0.4% of the stream) and butyraldehyde (0.2% of the stream). The rate of draw-off from the reactor, together with the rate of makeup phosphoric acid necessitated thereby, was controlled by observation of the composition of the dehydrator product, which was a vapor stripped out of the dehydration reactor by steam. Previous operating experience had shown that, under proper reaction conditions, the butyraldol content of this product vapor was low (about 5 to 7% of the organic portion of the vapor). Operating experience had also shown that, when the salt content of the material contained in the reactor became undesirably high, inhibiting intimate contact between liquid and oil phases in the reactor, the rate of the dehydration reaction was adversely affected and there was a substantial increase in the butyraldol content of the vapor product. A draw-off of liquid from the reactor was therefore routinely maintained in order to avoid the rise in butyraldol content of the product vapor which signals an unsatisfactory reaction condition.

Example II

A crude aldol product identical in composition and flow rate to that described above in Example I was continuously cooled to 110° F. and then continuously passed through a simple settling and decantation device comprising a cylindrical vessel equipped with an interface level controller and provided with connections for drawing off the contents of the vessel from one location above, and one location below, the interface level as maintained by the interface level controller. Two separate liquid phases formed in the decantation vessel, and a constant interface level between them was maintained through the action of the interface level controller. The lower phase, which was found to be aqueous, was drawn off continuously and amounted to 1,213 parts per hour of a liquid containing 1,210 parts per hour of water, 3.2 parts per hour of sodium hydroxide, less than 0.2 parts per hour of butyraldehyde, and negligible amounts of butyraldol. This phase was discarded. The upper (oil) phase was found to amount to 14,550 parts per hour and contained 7,050 parts per hour of butyraldehyde and 7,050 parts per hour of butyraldol, with about 450 parts of water and a negligible content of alkaline materials. This oil phase was fed continuously to the same dehydration system as described in Example I, operating in the same manner and with the same minimum content of phosphoric acid being maintained as in Example I. Substantially no makeup of fresh phosphoric acid was found to be required for the dehydration reaction system, and very little draw-off of liquid from the dehydration reaction system was required in order to maintain satisfactory operation of the dehydration reactor. A very small draw-off of 0 to 37 parts per hour was still maintained to remove organic resins which are formed in any event. Not only was the dehydration reaction maintained at a satisfactory rate, but it was actually accelerated, as indicated by a decrease in the butyraldol content of the organics distilled out of the reactor (3% as compared with 5% prior to installation of the decanter). The saving resulting from application of the invention amounted to 0.022 to 0.025 part of phosphoric acid per part of 2-ethyl hexenal produced.

In the foregoing Example II the separation of the two phases formed from the cooled aldol products was accomplished in a simple settling vessel provided with an interface level controller and adapted for use as a decanter. Approximately 0.004 square feet of interface surface (i.e. disengaging surface between the two liquid phases) was maintained per gallon of aldol product fed to the decanter per hour. Such a vessel will normally be found quite adequate for the practice of the invention. However, in systems in which separation and disengagement of the two phases one from the other is found to be slow, as where there may be found a tendency toward the formation of emulsion or macroemulsions, various equipment known in the art for effecting the separation of such materials may be employed. For example, centrifugation may be employed or various commonly known techniques for breaking emulsions may sometimes be found helpful. With the butyraldehyde system described above, however, such methods have been found to be unnecessary.

Example III

To 200 parts of propionaldehyde, 10 parts of 0.1 normal sodium hydroxide (approximately 0.02%) were added under conditions of continuous agitation, and with cooling being applied by means of a water jacket to control the temperature of the reacting propionaldehyde at between 40 and 50° C. The resulting aldol reaction was allowed to continue for thirty minutes, after which the product, containing propionaldehyde, was cooled to 20° C. To the cooled mixture 50 parts of water were then added under conditions of thorough agitation so that the water was well contacted with the organic material. The mixture was then allowed to stand for a period of two hours. It was found to have separated into two liquid phases. The lower, aqueous, phase was analyzed and found to contain 3.3% propionaldehyde and less than 0.1% propionaldol. The upper, oil, phase was analyzed and found to contain 4.8% water and less than 0.001% sodium hydroxide. On being subjected to dehydration conditions similar to those described in Examples I and II the oil layer dehydrates smoothly to form an unsaturated aldehyde. The water layer is subjected to simple distillation for the recovery of a substantial portion of its organic content.

Alkaline aldoling catalysts to the removal of which from the crude aldol product this invention is applicable include hydroxides and carbonates of sodium, potassium, and calcium; tertiary amines; and quaternary ammonium hydroxides. Acidic catalysts employed in the dehydration of aldols to unsaturated carbonyl compounds, the consumption of which acidic materials can be lessened by the application of this invention, include mineral acids, particularly sulfuric and phosphoric; alkyl and aryl sulfonic acids; and alkyl, aryl, and alkaryl acid sulfates and phosphates. In addition, solid acidic catalytic materials, such as ion exchange resins, can be protected against deactivation by the process of this invention. In the case of these solid catalysts the primary effect of the application of the invention is simply a reduction in the rate at which the acidic catalyst is neutralized and therefore deactivated. The formation of salts in the dehydration reaction system, with the resultant undesirable emulsion-breaking action previously discussed, is a less important factor than when soluble acidic catalysts are employed.

It is to be understood that the foregoing detailed description is merely given by way of illustration and that many variations may be made therein without departing from the spirit of my invention.

The embodiments of the invention in which an exclusive property or privilege is claimed are defined as follows:

1. In a process for preparing an unsaturated carbonyl compound from an aldol intermediate having up to 8 carbon atoms, which process comprises preparing said intermediate by aldoling a member selected from the group consisting of butyraldehydes and propionaldehyde in the presence of an alkaline water-soluble catalyst which is a member of the group consisting of hydroxides and carbonates of sodium, potassium, and calcium; tertiary amines; and quarternary ammonium hydroxides; recovering a crude aldol product comprising said aldol intermediate and said alkaline catalyst; bringing said intermediate into contact with an acidic dehydration catalyst; dehydrating said intermediate to said unsaturated carbonyl compound in the presence of said acidic dehydration catalyst; and recovering said unsaturated carbonyl compound from the product of the dehydration: the improvement which comprises cooling said crude aldol product, in admixture with liquid water, before bringing it into contact with the dehydration catalyst, to a temperature sufficiently low to cause the formation of two liquid phases, one being an oil phase comprising said aldol derivative and the other being an aqueous phase comprising water and said alkaline catalyst; separating said two liquid phases one from the other; withdrawing said aqueous phase and keeping it out of contact with the acidic dehydration catalyst; and employing said oil phase as feedstock for dehydration in the presence of said acidic catalyst to produce said unsaturated carbonyl compound.

2. The improvement of claim 1 wherein the aldol intermediate is butyraldol and the unsaturated carbonyl compound is 2-ethyl hexenal.

3. The improvement of claim 2 wherein the alkaline compound is sodium hydroxide.

4. The improvement of claim 3 wherein the crude aldol product is cooled to a temperature not substantially exceeding approximately 150° F. in order to cause formation of the two liquid phases.

5. The improvement of claim 4 wherein the composition of the crude aldol product is approximately 10 weight percent water, 45 weight percent butyraldol, 45 weight percent n-butyraldehyde, and 0.001 to 0.05 weight percent alkaline catalyst, calculated as sodium hydroxide.

6. The improvement of claim 4 wherein the separation of the oil phase from the aqueous phase is by simple decantation.

7. The improvement of claim 1 wherein the aldol intermediate is propionaldol, the carbonyl compound is propionaldehyde, and the alkaline catalyst is sodium hydroxide.

References Cited
UNITED STATES PATENTS 3,013,082  12/1961  Hagenmeyer et al. ____ 260—601

BERNARD HELFIN, *Primary Examiner.*

R. H. LILES, *Assistant Examiner.*

U.S. Cl. X.R.

260—601